(12) United States Patent
Kagy et al.

(10) Patent No.: US 7,228,828 B2
(45) Date of Patent: Jun. 12, 2007

(54) CONTROL SYSTEM AND METHOD FOR A VALVE ACTUATOR

(75) Inventors: Robert A. Kagy, Peoria, IL (US);
Jason K. Bloms, Peoria, IL (US);
Steven J. Funke, Mapleton, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 11/273,023

(22) Filed: Nov. 15, 2005

(65) Prior Publication Data
US 2006/0065221 A1 Mar. 30, 2006

Related U.S. Application Data

(63) Continuation of application No. 10/618,737, filed on Jul. 15, 2003, now Pat. No. 6,976,459.

(51) Int. Cl.
*F01L 1/34* (2006.01)
(52) U.S. Cl. .............................. 123/90.15; 123/90.12; 123/90.39
(58) Field of Classification Search ............. 123/90.12, 123/90.13, 90.39, 90.41, 90.44, 296, 297, 123/445, 90.15, 90.17
See application file for complete search history.

(56) References Cited

U.S. PATENT DOCUMENTS

| 3,250,068 | A | 5/1966 | Vulliamy |
| 4,424,790 | A | 1/1984 | Curtil |
| 4,561,253 | A | 12/1985 | Curtil |
| 4,815,423 | A | 3/1989 | Holmer |
| 4,869,222 | A | 9/1989 | Klassen |
| 5,408,979 | A | 4/1995 | Backlund et al. |
| 5,445,128 | A | 8/1995 | Letang et al. |
| 5,537,976 | A | * 7/1996 | Hu .............................. 123/322 |
| 5,576,963 | A | 11/1996 | Ribbens et al. |
| 5,682,854 | A | 11/1997 | Ozawa |
| 5,927,075 | A | 7/1999 | Khair |
| 6,021,758 | A | 2/2000 | Carey et al. |

(Continued)

FOREIGN PATENT DOCUMENTS

JP    02112641 A    4/1990

(Continued)

OTHER PUBLICATIONS

Edwards et al., "The Potential of a Combined Miller Cycle and Internal EGR Engine for Future Heavy Duty Truck Applications," The Engineering Society for Advancing Mobility Land Sea Air and Space International, International Congress and Exposition, Feb. 23-26, 1998, pp. 1-19.

(Continued)

*Primary Examiner*—Ching Chang
(74) *Attorney, Agent, or Firm*—Finnegan, Henderson, Farabow, Garrett & Dunner

(57) ABSTRACT

A method of controlling an engine having a valve actuation system is provided. The engine is started. A first parameter indicative of a first temperature of the engine is sensed. A second parameter indicative of a second temperature of the engine is sensed. The valve actuation system is disabled to prevent the implementation of a variation on conventional engine valve actuation timing in response to each of the first and second temperatures being below a predetermined value.

19 Claims, 6 Drawing Sheets

U.S. PATENT DOCUMENTS

| | | | |
|---|---|---|---|
| 6,026,786 A | 2/2000 | Groff et al. | |
| 6,082,328 A | 7/2000 | Meistrick et al. | |
| 6,170,441 B1 | 1/2001 | Haldeman et al. | |
| 6,209,516 B1 | 4/2001 | Yamashita | |
| 6,237,551 B1 | 5/2001 | Macor et al. | |
| 6,267,107 B1 | 7/2001 | Ward | |
| 6,273,076 B1 | 8/2001 | Beck et al. | |
| 6,279,550 B1 | 8/2001 | Bryant | |
| 6,301,887 B1 | 10/2001 | Gorel et al. | |
| 6,301,889 B1 | 10/2001 | Gladden et al. | |
| 6,302,076 B1 | 10/2001 | Bredy | |
| 6,374,783 B1 | 4/2002 | Toriumi | |
| 6,467,452 B1 | 10/2002 | Duffy et al. | |
| 6,474,308 B2 * | 11/2002 | Okumura et al. | 123/491 |
| 6,571,765 B2 | 6/2003 | Kuboshima et al. | |
| 6,640,758 B2 * | 11/2003 | Ashida | 123/90.15 |
| 6,651,618 B1 | 11/2003 | Coleman et al. | |
| 6,688,280 B2 | 2/2004 | Weber et al. | |
| 6,718,957 B2 | 4/2004 | Kakuho et al. | |
| 6,976,459 B2 * | 12/2005 | Kagy et al. | 123/90.15 |

FOREIGN PATENT DOCUMENTS

| | | |
|---|---|---|
| JP | 05106415 A2 | 4/1993 |
| JP | WO 98/02653 | 1/1998 |
| JP | 2000120457 A | 4/2000 |
| JP | 2000145484 A | 5/2000 |
| JP | 2001107795 A | 4/2001 |
| WO | WO 2003010420 A1 * | 2/2003 |

OTHER PUBLICATIONS

Obert, "Internal Combustion Engines and Air Pollution," Based on Internal Combustion Engines, Third Edition, 1973, pp. 612-614.

Challen et al., "Diesel Engine Reference Book, Section Edition," SAE International, 1999, pp. 75, 81, 84, 146, and 263-305.

Yorihiro Fukuzawa et al., "Development of High Efficiency Miller Cycle Gas Engine"<Mitsubishi Heavy Industries, Ltd., Technical Review, vol. 38, No. 3, Oct. 2001, pp. 146-150.

Request for *Inter Partes* Reexamination Transmittal Form for US Patent 6,688,280, and Attachment to Request for *Inter Partes Reexamination Transmittal Form*, Sep. 17, 2004.

Request for *Inter Partes* Reexamination Transmittal Form for US Patent 6,651,618 and Attachment to Request for *Inter Partes Reexamination Transmittal Form*, Aug. 27, 2004.

http://www.mazda.com.au/corpora/209.html. Oct. 16, 2001, p. 1-6.

* cited by examiner

CONTROL SYSTEM AND METHOD FOR A VALVE ACTUATOR

PRIORITY

This is a continuation of application Ser. No. 10/618,737, filed Jul. 15, 2003 now U.S. Pat. No. 6,976,459, which is incorporated herein by reference.

TECHNICAL FIELD

The present invention is directed to a valve actuation system and, more particularly, to a control system and method for a valve actuator in a valve actuation system.

BACKGROUND

The operation of an internal combustion engine, such as, for example, a diesel, gasoline, or natural gas engine, may cause the generation of undesirable emissions. These emissions, which may include particulates and oxides of nitrogen (NOx), are generated when fuel is combusted in a combustion chamber of the engine. An exhaust stroke of an engine piston forces exhaust gas, which may include these emissions, from the engine. If no emission reduction measures are in place, these undesirable emissions will eventually be exhausted to the environment.

Research is currently being directed towards decreasing the amount of undesirable emissions that are exhausted to the environment during the operation of an engine. It is expected that improved engine design and improved control over engine operation may lead to a reduction in the generation of undesirable emissions. Many different approaches, such as, for example, exhaust gas recirculation, water injection, fuel injection timing, and fuel formulations, have been found to reduce the amount of emissions generated during the operation of an engine. Aftertreatments, such as, for example, traps and catalysts have been found to effectively remove emissions from an exhaust flow. Unfortunately, the implementation of these emission reduction approaches typically results in a decrease in the overall efficiency of the engine.

Additional efforts are being focused on improving engine efficiency to compensate for the efficiency loss due to the emission reduction systems. One such approach to improving the engine efficiency involves adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston. This may result in an improvement in the overall efficiency of the engine.

An engine may be equipped with a variable valve actuation system that provides for selective adjustment of the actuation timing of the engine valves. The variable valve actuation system may be controlled to selectively override the valve actuation timing provided by a conventional cam-driven valve actuation system. In a conventional cam-driven valve actuation system, the engine valves are actuated by a cam arrangement that is operatively connected to the engine crankshaft. A rotation of the crankshaft results in a corresponding rotation of a cam that drives one or more cam followers. The movement of the cam followers results in the actuation of the engine valves. Thus, the shape of the cam governs the timing and duration of the valve actuation.

As described in U.S. Pat. No. 6,237,551 to Macor et al., issued on May 29, 2001, a hydraulically powered valve actuator may be incorporated with a conventional cam assembly to allow for selective implementation of a variation on conventional valve actuation timing. In particular, a variable valve actuator may be disposed between the cam arrangement and the engine valve. The variable valve actuator may include a chamber in which fluid may be sealed to establish a hydraulic link between the cam and the engine valve. When the hydraulic link is established, all of the valve motion provided by the shape of the cam is used to actuate the engine valve. To vary the actuation timing of the engine valve, a control valve may be opened to allow fluid to flow from the chamber. The release of the fluid breaks the hydraulic link between the cam and the engine valve and the engine valve is allowed to close, independently of the shape of the cam. In this manner, a variable valve actuator may be used to selectively vary the actuation timing of an engine valve.

Changes in the properties of the fluid used to operate a variable valve actuation system may change the operation of the actuation system. An unexpected change in a fluid property may change the rate at which fluid flows into and out of the chamber of the hydraulic actuator. An increase or decrease in the fluid flow rate may result in an increase or decrease in the time required for the valve actuator to operate.

For example, when the engine is starting, the operating fluid may have a cold temperature and, thus, a high viscosity. The high viscosity of the fluid increases the amount of time required for the valve actuator to operate. This increased operation time may unexpectedly change the valve actuation timing and reduce or eliminate any performance gains that may have been achieved by implementing a variation on the conventional valve actuation timing.

The control system and method of the present disclosure solves one or more of the problems set forth above.

SUMMARY OF THE INVENTION

In one aspect, the present invention is directed to a method of controlling an engine having a valve actuator. A first parameter indicative of a first temperature of the engine is sensed. A second parameter indicative of a second temperature of the engine is sensed. The valve actuator is disabled to prevent the implementation of a variation on conventional engine valve actuation timing in response to each of the first and second temperatures being below a predetermined value.

In another aspect, the present invention is directed to a valve actuation system for an engine having an intake valve moveable between a first position and a second position. A valve actuator selectively engages the intake valve to prevent the intake valve from returning to the first position. A first sensor senses a first parameter indicative of a first temperature of the engine. A second sensor senses a second parameter indicative of a second temperature of the engine. A controller disables the valve actuator to prevent the valve actuator from engaging the intake valve when each of the first and second temperatures are below a predetermined value.

DETAILED DESCRIPTION

Figure 1:
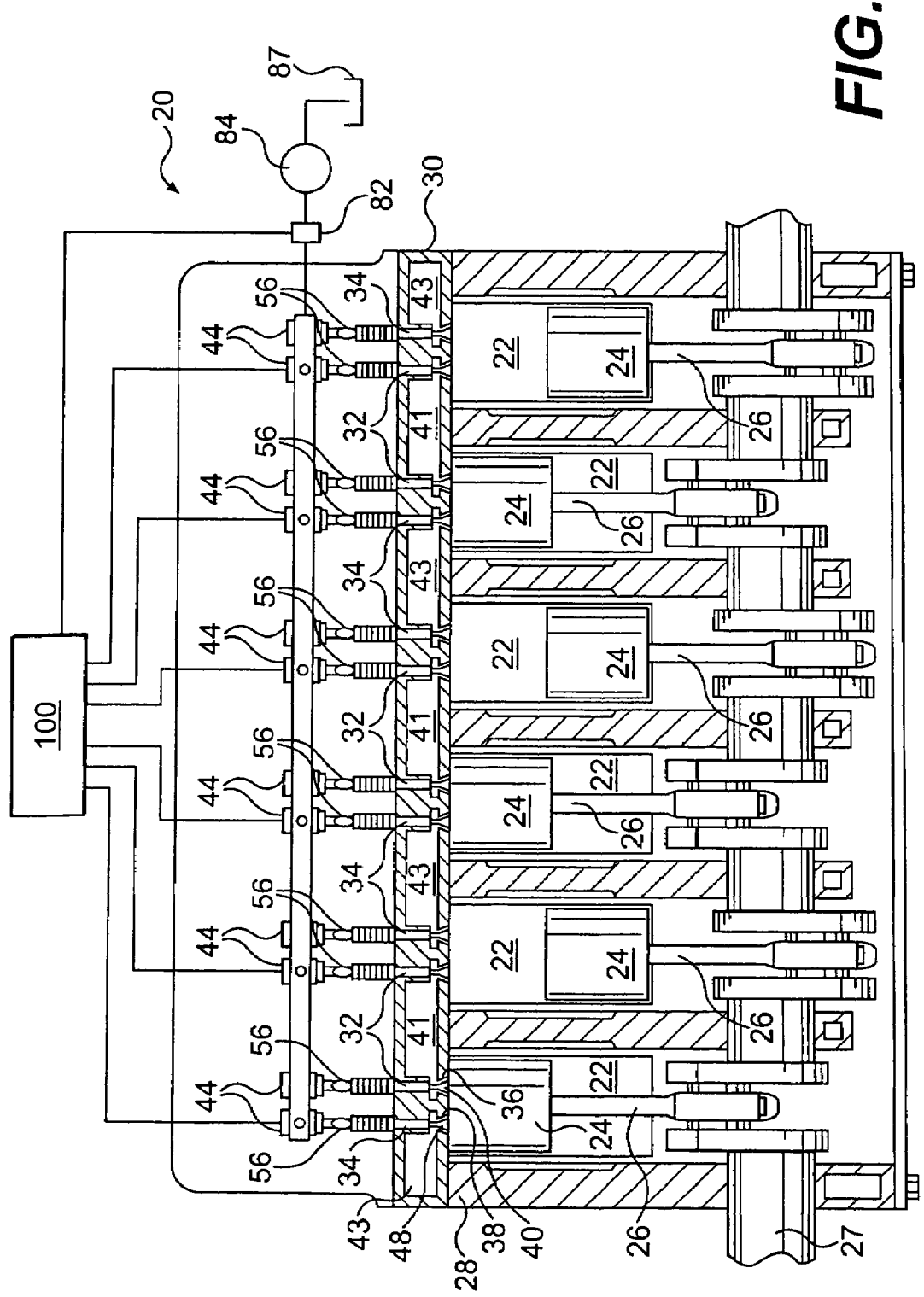
FIG. 1 is a diagrammatic cross-sectional view of an internal combustion engine in accordance with an exemplary embodiment of the present invention.

An exemplary embodiment of a control system for an engine 20 having a variable valve actuation system is illustrated in FIG. 1. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

Engine 20 includes an engine block 28 that defines a plurality of cylinders 22. A piston 24 is disposed for sliding movement between a top dead center position and a bottom dead center position within each cylinder 22. In the illustrated embodiment, engine 20 includes six cylinders 22 and six associated pistons 24. One skilled in the art will recognize that engine 20 may include a greater or lesser number of pistons 24 and that pistons 24 may be disposed in an "in-line" configuration, a "V" configuration, or any other conventional configuration.

Engine 20 also includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will result in a sliding motion of piston 24.

Engine 20 further includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 may be disposed within each intake port 36. Intake valve 32 includes a valve element 40 that is configured to selectively block intake port 36. As described in greater detail below, each intake valve 32 may be actuated to lift valve element 40 to thereby open the respective intake port 36. The intake valves 32 for each cylinder 22 may be actuated in unison or independently.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to lift valve element 48 to thereby open the respective exhaust port 38. The exhaust valves 34 for each cylinder 22 may be actuated in unison or independently.

Figure 2:
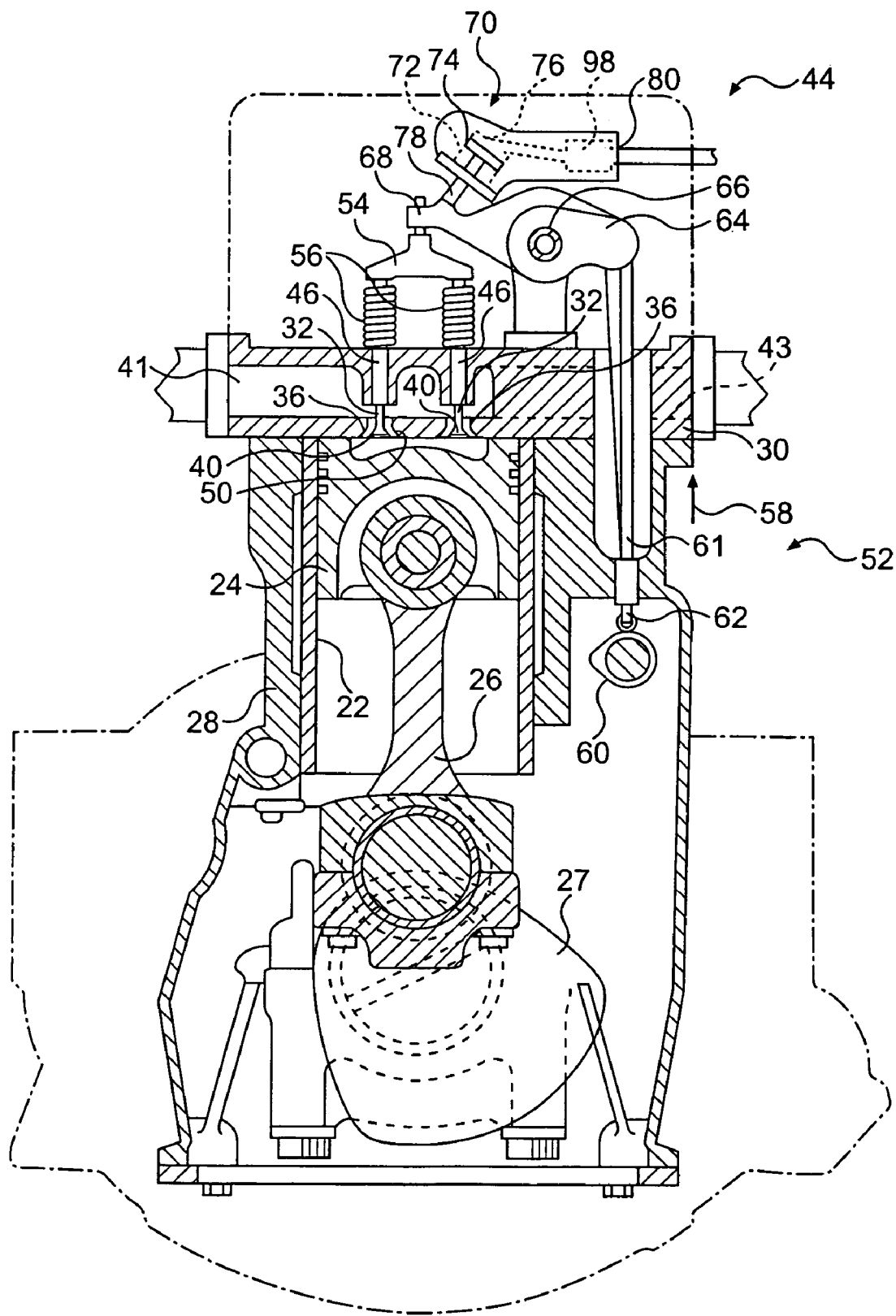
FIG. 2 is a diagrammatic cross-sectional view of a cylinder and valve actuation assembly in accordance with an exemplary embodiment of the present invention.

FIG. 2 illustrates an exemplary embodiment of one cylinder 22 of engine 20. As shown, cylinder head 30 defines a pair of intake ports 0.36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and block fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 1) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22. When exhaust valve 34 is lifted from the closed position, exhaust valve 32 allows a flow of fluid relative to cylinder 22.

As shown in FIGS. 1 and 2, engine 20 includes a series of valve actuation assemblies 44. One valve actuation assembly 44 may be operatively associated with each pair of intake valves 32 for each cylinder 22. Each valve actuation assembly 44 is operable to move or "lift" the associated intake valve 32 or exhaust valve 34 from a first, or closed, position to a second, or open, position.

In the exemplary embodiment of FIG. 2, valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 may also include a rocker arm 64. Rocker arm 64 is configured to pivot about a pivot 66. One end 68 of rocker arm 64 is connected to bridge 54. The opposite end of rocker arm 64 is connected to a cam assembly 52. Cam assembly 52 may include a cam 60 that has a cam lobe and is mounted on a cam shaft, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear reduction assembly (not shown). As one skilled in the art will recognize, a rotation of cam 60 will cause cam follower 62 and associated push rod 61 to periodically reciprocate between an upper and a lower position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 controls the timing of the actuation of intake valves 32. As one skilled in the art will recognize, cam 60 may be configured to coordinate the actuation of intake valves 32 with the movement of piston 24. For example, cam 60 may be configured to actuate intake valves 32 with a conventional valve timing. In a conventional valve timing, intake valves 32 may be actuated to open intake ports 36 when piston 24 is at or near a top-dead-center position at the beginning of an intake stroke to allow air to flow from intake passageway 41 into cylinder 22. In the conventional valve timing, Intake valves 32 may return to a closed position when piston 24 is at or near a bottom-dead-center position at the end of the intake stroke to stop the flow of air into cylinder 22.

A similar valve actuation assembly 44 may be connected to exhaust valves 34. A second cam (not shown) may be connected to crankshaft 27 to control the actuation timing of exhaust valves 34. In a conventional valve timing, exhaust valves 34 may be actuated to open exhaust ports 38 when piston 24 is at or near a bottom-dead-center position in an exhaust stroke to allow exhaust gas to flow from cylinder 22 into exhaust passageway 43. In the conventional valve timing, exhaust valves 34 may be closed when piston 24 is at or near a top-dead-center position in the exhaust stroke to stop the flow of exhaust gas into exhaust passageway 43.

Figure 3:
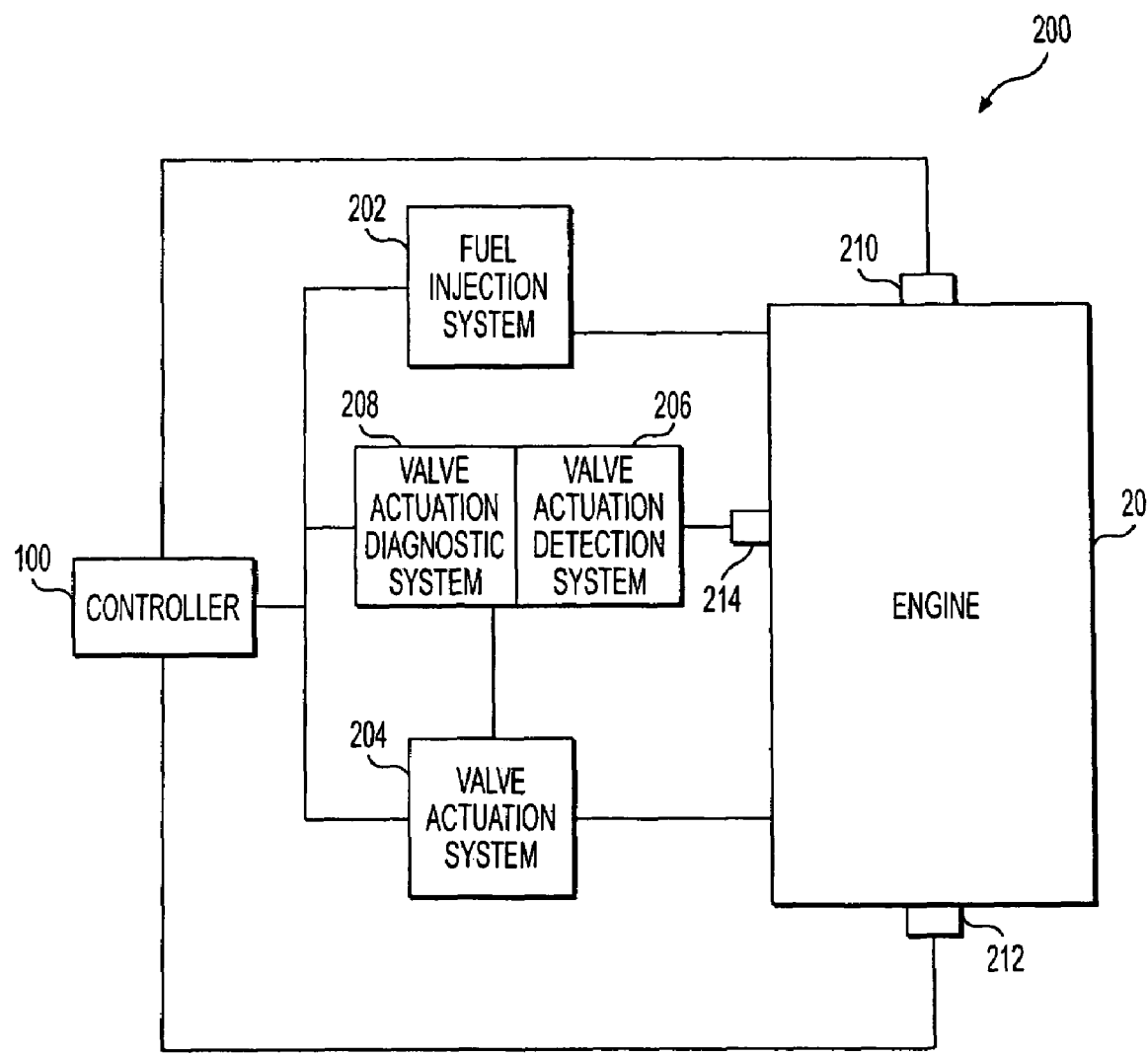
FIG. 3 is a schematic and diagrammatic representation of an engine system in accordance with an exemplary embodiment of the present invention.

As shown in FIG. 3, engine 20 may be included within an engine system 200. Engine system 200 may include a series of auxiliary systems. For example, engine system 200 may include a fuel injection system 202, a valve actuation system 204, a valve actuation detection system 206, and a valve actuation diagnostic system 208. It is contemplated that engine system 200 may include alternative and/or additional auxiliary systems.

Fuel injection system 202 may include a series of fuel injectors (not shown). Each fuel injector may be controlled to inject a certain quantity of fuel into each cylinder 22 of engine 20 based on demands from the operator and/or the current operating conditions of engine 20. Each fuel injection may consist of multiple "shots" of fuel, such as, for example, a pilot injection and a main injection.

It is contemplated that the fuel injectors may be any type of fuel injector commonly used with an internal combustion engine. For example, the fuel injectors may be, for example, mechanically, hydraulically, or electrically actuated. In addition, the fuel injectors may be driven through a combination of mechanical, hydraulic, and electrical forces.

Valve actuation system 204 of engine system 200 may be adapted to vary the actuation timing of the engine valves. In the exemplary embodiment illustrated in the accompanying figures, valve actuation system 204 is depicted as an "extended motion" system, where the valve actuation timing may be extended from the shape of the cam. It is contemplated, however, that the concepts of the present disclosure may be applied to other types of variable valve actuation systems, such as, for example, "lost motion" systems, where the valve actuation timing is shortened, or decreased, from the shape of the cam.

Figure 4:
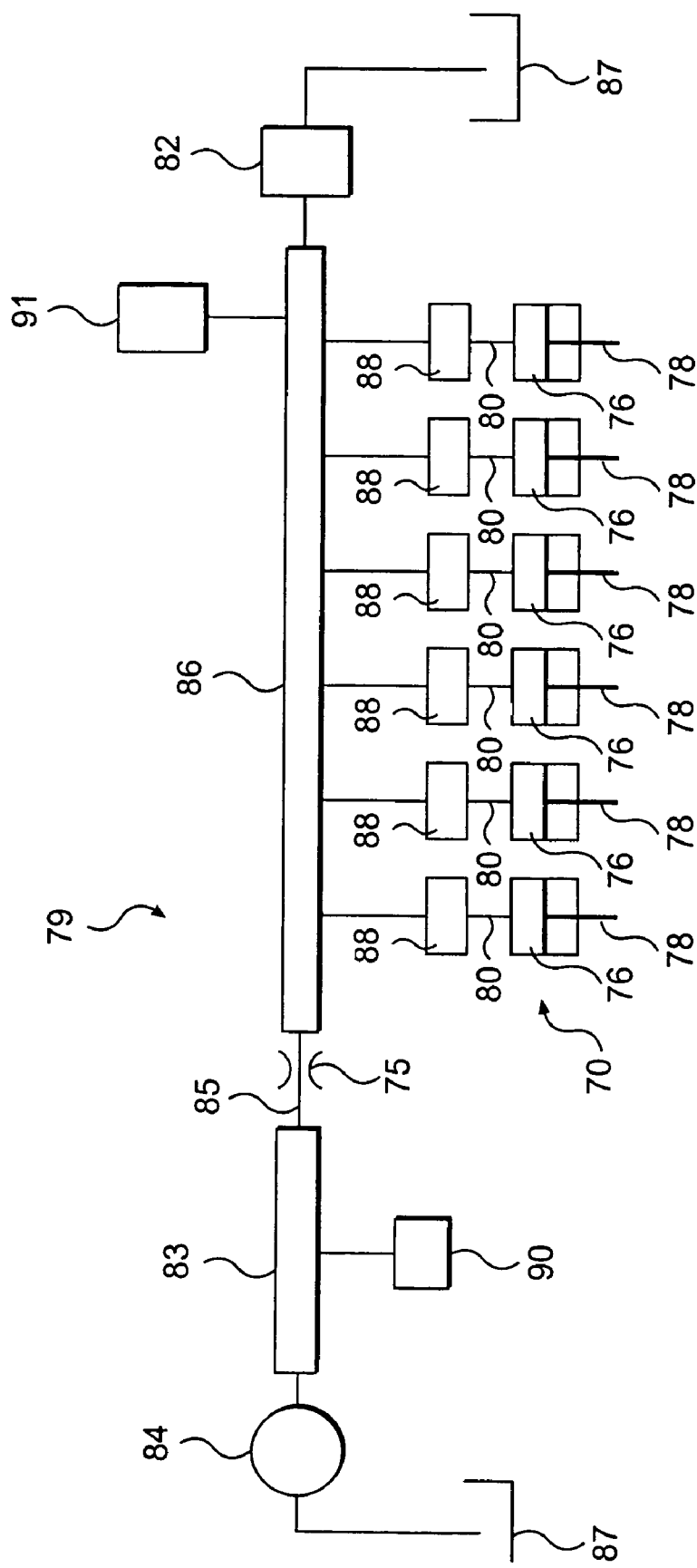
FIG. 4 is a schematic and diagrammatic representation of a fluid supply system for a hydraulic actuator in accordance with an exemplary embodiment of the present invention.

Valve actuation system 204 includes a series of valve actuators 70 (referring to FIGS. 2 and 4). As shown in FIG. 2 one valve actuator 70 may be associated with intake valves 32. A similar valve actuator 70 may be associated with intake valves 32 for each cylinder 22 in engine 20 (referring to FIG. 1).

Each valve actuator 70 may include an actuator cylinder 72 that defines an actuator chamber 76. An actuator piston 74 is slidably disposed within actuator cylinder 72 and is connected to an actuator rod 78. A return spring (not shown) may act on actuator piston 74 to return actuator piston 74 to a home position. Actuator rod 78 is engageable with an end 68 of rocker arm 64. It should be noted, however, that actuator rod 78 may be engaged with another portion of valve actuation assembly 44.

A fluid line 80 is connected to actuator chamber 76. Pressurized fluid may be directed through fluid line 80 into actuator chamber 76 to move actuator piston 74 within actuator cylinder 72. Movement of actuator piston 74 causes actuator rod 78 to engage end 68 of rocker arm 64.

Fluid may be introduced to actuator chamber 76 when intake valves 32 are in the open position to move actuator rod 78 into engagement with rocker arm 64 to thereby hold intake valves 32 in the open position. Alternatively, fluid may be introduced to actuator chamber 76 when intake valves 32 are in the closed position to move actuator rod 78 into engagement with rocker arm 64 and pivot rocker arm 64 about pivot 66 to thereby open intake valves 32.

As illustrated in FIGS. 1 and 4, a source of fluid 84 may draw fluid from a tank 87 that holds a supply of fluid, which may be, for example, a hydraulic fluid, a lubricating oil, a transmission fluid, or fuel. Referring to FIG. 4, source of fluid 84 may increase the pressure of the fluid and direct the fluid into a main gallery 83. Source of fluid 84 and main gallery 83 may be part of a lubrication system, such as typically accompanies an internal combustion engine. Main gallery 83 may contain pressurized fluid having a pressure of, for example, less than 700 KPa (100 psi) or, more particularly, between about 210 KPa and 620 KPa (30 psi and 90 psi). Alternatively, the source of hydraulic fluid may be a pump configured to provide fluid at a higher pressure, such as, for example, between about 10 MPa and 35 MPa (1450 psi and 5000 psi).

A fluid supply system 79 connects main gallery 83 with valve actuators 70. A restrictive orifice 75 may be positioned in fluid line 85 between main gallery 83 and a first end of fluid rail 86. A control valve 82 may be connected to an opposite end of fluid rail 86 and lead to tank 87. Control valve 82 may be opened to allow a flow of fluid through restrictive orifice 75 and fluid rail 86 to tank 87. Control valve 82 may be closed to allow a build up of pressure in the fluid within fluid rail 86.

Fluid rail 86 may supply pressurized fluid to a series of valve actuators 70. Each valve actuator 70 may be associated with either the intake valves 32 or the exhaust valves 34 of a particular engine cylinder 22 (referring to FIG. 1). Fluid lines 80 direct pressurized fluid from fluid rail 86 into the actuator chamber 76 of each valve actuator 70.

A directional control valve 88 may be disposed in each fluid line 80. Each directional control valve 88 may be opened to allow pressurized fluid to flow between fluid rail 86 and actuator chamber 76. Each directional control valve 88 may be closed to prevent pressurized fluid from flowing between fluid rail 86 and actuator chamber 76. Directional control valve 88 may be normally biased into a closed position and actuated to allow fluid to flow through directional control valve 88. Alternatively, directional control valve 88 may be normally biased into an open position and actuated to prevent fluid from flowing through directional control valve 88. One skilled in the art will recognize that directional control valve 88 may be any type of controllable valve, such as, for example a two coil latching valve.

One skilled in the art will also recognize that fluid supply system 79 may have a variety of different configurations and include a variety of different components. For example, fluid supply system 79 may include one or more check valves (not shown). A first check valve may be placed in parallel with directional control valve 88 between restrictive orifice 75 and valve actuator 70. A second check valve may be placed in fluid line 85 between main gallery 83 and fluid rail 86. In addition, fluid supply system 79 may include a source of high pressure fluid. Fluid supply system 79 may also include a snubbing valve that controls the rate of fluid flow from valve actuator 70 and a damping system, which may include an accumulator and a restricted orifice, that prevents pressure oscillations in actuator chamber 76 and fluid line 80.

As shown in FIG. 1, a controller 100 is connected to each valve actuation assembly 44 and to control valve 82. Controller 100 may include an electronic control module that has a microprocessor and a memory. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

As shown in FIG. 3, controller 100 may be connected with the various auxiliary systems in engine system 200. Controller 100 may be programmed to control one or more aspects of the operation of engine 20. For example, controller 100 may be programmed to control fuel injection system 202 and valve actuation system 204. Controller 100 may control engine 20 based on the current operating conditions of the engine and/or instructions received from an operator.

Controller 100 may receive information from one or more sensors operatively connected with engine 20. Each of the one or more sensors may be configured to sense an operating parameter of engine 20. For example, a first temperature sensor 210 may be disposed on engine 20 to provide an indication of a temperature of the engine coolant and a second temperature sensor 212 may be disposed on engine 20 to provide an indication of a temperature of an intake manifold. In addition, as shown in FIG. 4, fluid sensors 90 and 91 may be connected with fluid supply system 79 to sense the temperature and/or pressure of the fluid within fluid supply system 79.

Engine 20 may be further equipped with a sensor configured to monitor the crank angle of crankshaft 27. The position of pistons 0.24 within their respective cylinders 22 may be determined by the crank angle of crankshaft 27. As one skilled in the art will recognize, a piston in a conventional four-stroke diesel cycle reciprocates between a top dead center position and a bottom dead center position through a combustion stroke, an exhaust stroke, an intake stroke, and a compression stroke. Each piston stroke correlates to about 180° of crankshaft rotation. Thus, piston 24 may begin the combustion stroke at about 0°, the exhaust stroke at about 180°, the intake stroke at about 360°, and the compression stroke at about 540°.

Figure 5:
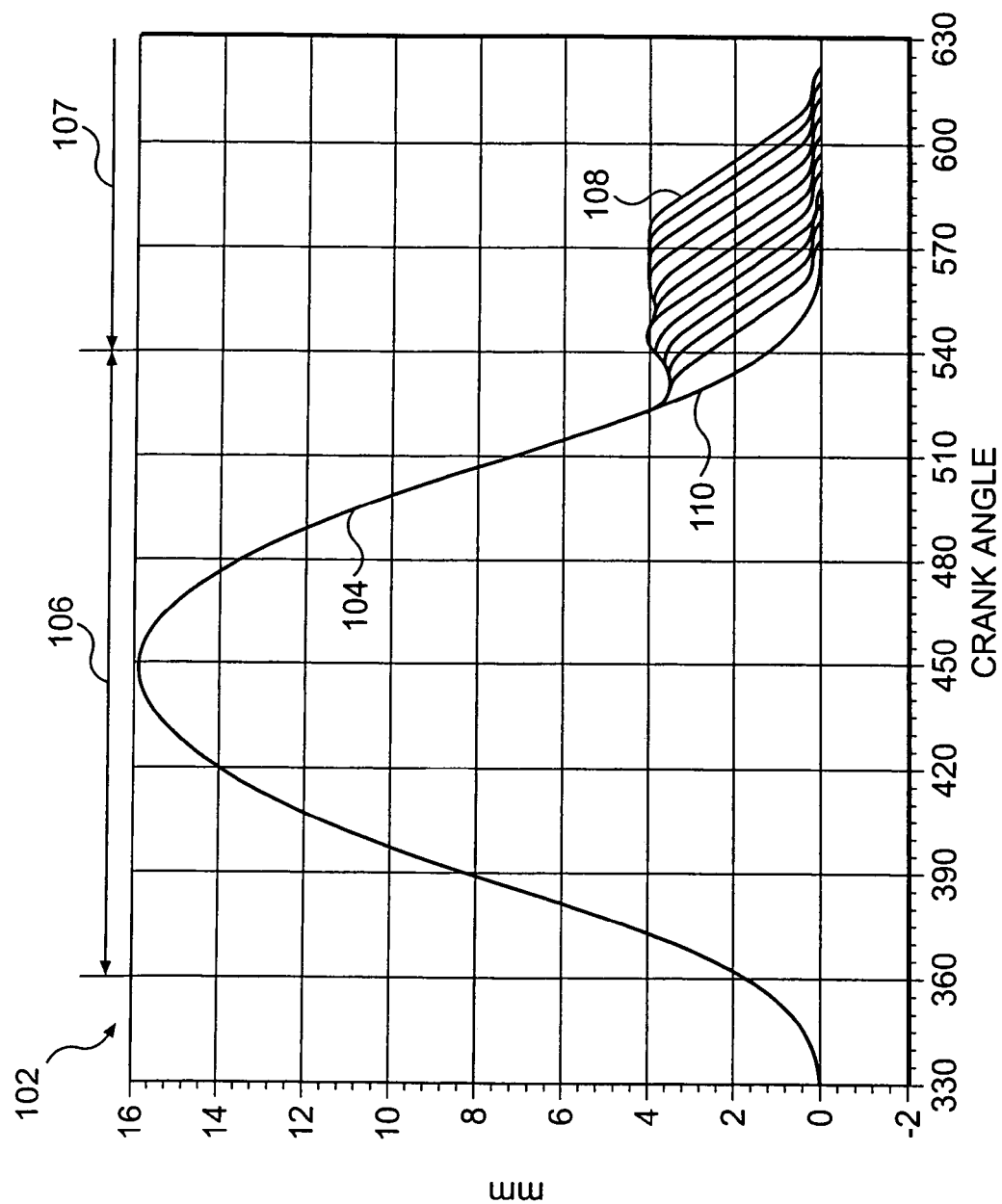
FIG. 5 is a graphic illustration of an exemplary intake valve actuation.

The crank angle of crankshaft 27 is also related to actuation timing of intake valves 32 and exhaust valves 34. An exemplary graph 102 indicating the relationship between an intake valve actuation 104 and crankshaft 27 crank angle is illustrated in FIG. 5. As shown, intake valve 32 begins to open at about 360° of crankshaft rotation, i.e. when piston 24 is at or near a top dead center position of an intake stroke 106.

Controller 100 may enable valve actuation system 204 to implement a variation on the conventional actuation timing of intake valves 32. Controller 100 may enable valve actuators 70 by closing control valve 82 (referring to FIG. 4). This allows fluid pressure to increase in fluid rail 86. As described in greater detail below, the pressurized fluid may flow into actuator chambers 76 to delay the closing of intake valves 32. For example, as shown in FIG. 5, the closing of intake valves 32 may be delayed from a conventional closing 110 to a delayed closing 108.

Controller 100 may disable valve actuation system 204 to prevent the implementation of a variation on the conventional actuation timing of intake valves 32 by opening control valve 82 (referring to FIG. 4). When control valve 82 is open, fluid will flow through fluid rail 86 without a significant increase in pressure. Under these circumstances, fluid may not flow into actuator chambers 76. Accordingly, valve actuators 70 may not delay the closing of intake valves 32.

With reference to FIG. 3, controller 100 may also be connected with valve actuation detection system 206 and valve actuation diagnostic system 208 of engine system 200 to monitor valve actuation system 204 and ensure that valve actuators 70 are operating properly. Valve actuation detection system 206 may include one or more sensors (not shown) operatively engaged with valve actuation system 204 and/or engine 20. Each sensor may be adapted to sense an operating parameter indicative of the operation of valve actuators 70. Valve actuation detection system 206 collects information related to the operation of valve actuators 70 and provides this information to valve actuation diagnostic system 208. Valve actuation diagnostic system 208 may use the information provided by valve actuation detection system 206 to determine the cause of any detected problem in the operation of valve actuation system 204.

Valve actuation detection system 206 may monitor any of several different parameters to obtain information related to the operation of valve actuation system 204. For example, valve actuation detection system 206 may include a current sensor (not shown) that is adapted to sense a current transmitted to directional control valve 88. An inflection in the current applied to directional control valve 88 may be experienced when directional control valve 88 reaches a closed position. This current inflection may be caused by a change in the resistance and/or inductance of directional control valve 88 when the valve reaches the closed position. If no current inflection is detected during the operation of valve actuator 70, controller 100 may identify this condition as a possible failure of directional control valve 88 and of valve actuator 70.

Valve actuation detection system 206 may also include an engine sensor 214 adapted to sense an operating parameter of engine 20. For example, engine sensor 214 may sense the rotational speed of crankshaft 27, the torque exerted by engine 20, and/or the pressure within one or more cylinders 22. Controller 100 may monitor one or more of these parameters to verify valve actuators 70 are operating properly. An unexpected increase or decrease in one or more of these parameters may indicate that valve actuators 70 are not operating properly.

Controller 100 may also monitor and analyze a combination of engine parameters to determine if valve actuators 70 are operating properly. For example, controller 100 may monitor the pressure within cylinder 22 as a function of the crankshaft 27 angle and/or piston 24 position. Controller 100 may also determine an estimated cylinder pressure as a function of piston position for the current engine operating conditions. Controller 100 may compare the monitored cylinder pressure to the predicted cylinder pressure at different piston positions. A significant difference between the predicted cylinder pressure and the monitored cylinder pressure may indicate that valve actuator 70 is not functioning properly.

Alternatively, controller 100 may monitor the motion of actuator rod 78 and/or actuator piston 74 through a position sensor (not shown). Actuator rod 78 and actuation piston 74 should move in a reciprocating pattern when valve actuator 70 is operating properly. A failure of actuator piston 74 or actuator rod 78 to move may indicate that valve actuator 70 is not functioning properly.

Controller 100 may also monitor the pressure of the hydraulic fluid within actuator chamber 76 or within fluid system 79 through fluid sensor 91 (referring to FIG. 4). When valve actuators 70 are operating properly, the pressure of the fluid within each actuator chamber 76 will increase when actuator rod 78 engages end 68 of rocker arm 64. The pressure of the fluid within fluid rail 86 will fluctuate as fluid flows into and out of actuator chamber 76. Accordingly, a failure of fluid sensor 91 to detect pressure fluctuations may indicate that valve actuator is not functioning properly.

With reference to FIG. 3, controller 100 may also be connected with valve actuation diagnostic system 208. As noted above, valve actuation diagnostic system 208 may be adapted to monitor the information related to the operation of valve actuation system 204 as provided by valve actuation detection system 206. Valve actuation diagnostic system 208 may generate diagnostic information related to the operation of valve actuation system 204 based on the information from valve actuation detection system 206. For example, valve actuation diagnostic system 208 may collect the number of "good" valve actuations, the number of "faulty" valve actuations, and/or the amount of time that the valve actuation system 204 has been active.

Controller 100 may govern the operation of valve actuation system 204 based on information provided by the sensors and/or the auxiliary systems. Controller 100 may engage one of several operating modes to achieve optimum engine performance under the current operating conditions. An exemplary method 300 of controlling engine 20 during a start sequence is illustrated in FIG. 6 and is described in greater detail below.

INDUSTRIAL APPLICABILITY

When engine 20 is being started, controller 100 may engage one of several operating modes based on information provided to controller 100 from the sensors and/or the auxiliary systems. For example, when engine 20 is started, engine 20 may be operated in one of a "cold" mode, a "transition" mode, or a "warm start" mode depending upon the sensed temperatures of engine 20. After engine 20 has reached normal operating temperatures and valve actuation system 204 is operating properly, the operation of engine 20 may be switched to a "normal" mode.

Figure 6:
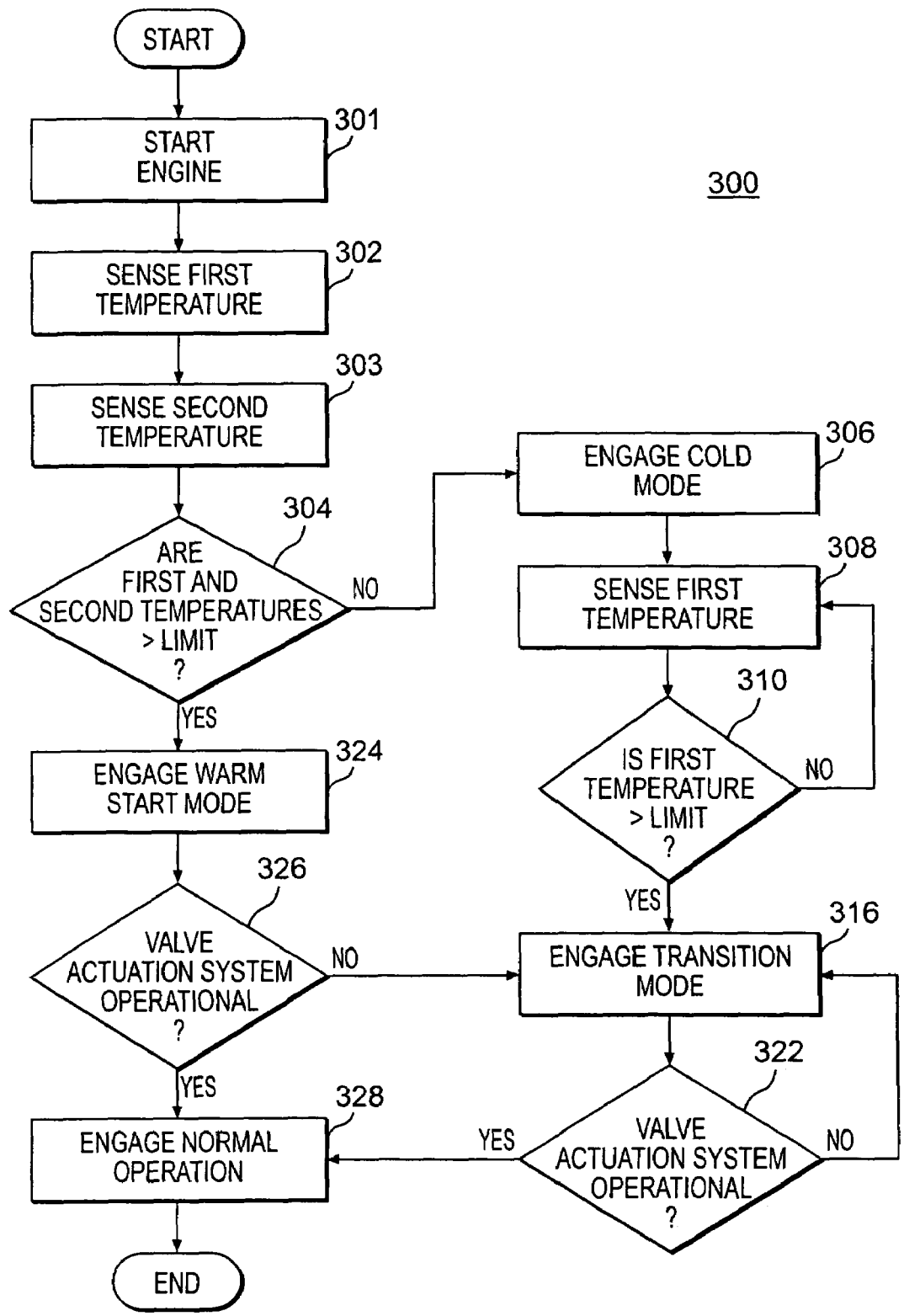
FIG. 6 is a flowchart illustrating an exemplary method of controlling the operation of an engine in accordance with the present invention.

With reference to the flowchart of FIG. 6, after the engine is started (step 301) a first temperature is sensed. (Step 302). The first temperature may be representative of the temperature of engine 20. For example, the first temperature may be indicative of the temperature of the engine coolant as sensed by first temperature sensor 210.

A second temperature may also be sensed. (Step 303). The second temperature may also be representative of the temperature of engine 20. For example, the second temperature may be indicative of the temperature of the intake manifold as sensed by second temperature sensor 212. The second temperature may also be indicative of the temperature of the outside ambient air or of the temperature of a heat-soaked engine.

The first and second temperatures are compared to a predetermined limit. (Step 304). If either of the first and second temperatures are less than the predetermined limit, engine 20 is presumed to be starting cold. The predetermined limit may be, for example, approximately 20° C. (68° F.). It should be noted that the predetermined limit for the first temperature may be different that the predetermined limit for the second temperature.

If either of the first and second temperatures are below the predetermined limit, controller 100 may engage "cold mode" operation. (Step 306). When engine 20 is cold, the viscosity of the fluid used to operate valve actuators 70 may be too high to allow for proper operation of valve actuators 70. Accordingly, controller 100 opens control valve 82 (referring to FIG. 4) to disable the valve actuation system 204 and prevent the implementation of a variation on the conventional valve actuation timing.

Opening control valve 82 may also increase the rate at which the operating fluid warms. With control valve 82 open, operating fluid may circulate through fluid rail 86. This may allow the operation of engine 20 to increase the temperature of the operating fluid faster than if control valve 82 remained closed and the operating fluid were not allowed to circulate through fluid rail 86.

Controller 100 may also govern the operation of other engine systems during cold mode operation. For example, controller 100 may govern valve actuation detection system 206 and valve actuation diagnostic system 208. Controller 100 may also control fuel injection system 202 to limit the quantity of fuel injected into cylinders 22. In particular, controller 100 may limit the quantity of fuel injected into cylinders 22 to a single fuel "shot" and/or to limit the amount of torque generated by engine 20. It is contemplated that other engine systems 20 may be similarly controlled during cold mode operation to prevent damage to engine 20 or any associated engine components.

The first temperature, which may be the engine coolant temperature, may be sensed on a periodic or continual basis. (Step 308). The first temperature is measured against the predetermined limit. (Step 310). As long as the first temperature remains below the predetermined limit, controller will operate engine 20 in the cold mode.

When the first temperature rises above the predetermined limit, controller 100 may engage "transition mode" operation. (Step 316). In transitional mode operation, engine 20 may be presumed to be transitioning from a cold operating condition to a normal operating condition. The temperature of the operating fluid may have also increased, and the fluid viscosity decreased, to allow valve actuators 70 to operate properly.

In transition mode operation, controller 100 may enable valve actuation system 204 to allow the implementation of a variation on the conventional valve actuation timing. This may be accomplished by closing control valve 82 (referring to FIG. 4) to increase the pressure of the operating fluid in fluid rail 86. Controller 100 may also open and close directional control valves 88 (referring to FIG. 4) to activate each valve actuator 70.

For example, controller 100 may open directional control valves 88 to allow pressurized fluid to flow from fluid rail 86 to actuator chamber 76 as the associated piston is moving towards a bottom-dead-center position of an intake stroke. The force of the fluid entering actuator chamber 76 moves actuator piston 74 so that actuator rod 78 follows end 68 of rocker arm 64 as rocker arm 64 pivots to open intake valves 32 (referring to FIG. 2). When actuator chamber 76 is filled with fluid and rocker arm 64 returns intake valves 32 from the open position to the closed position, actuator rod 78 will engage end 68 of rocker arm 64.

Controller 100 may close directional control valve 88 to prevent fluid from escaping from actuator chamber 76. As cam 60 continues to rotate and springs 56 urge intake valves 32 towards the closed position, actuator rod 78 will engage end 68 of rocker arm and prevent intake valves 32 from closing. As long as directional control valve 88 remains in the closed position, the fluid trapped in actuator chamber 76 will prevent springs 56 from returning intake valves 32 to the closed position. Thus, valve actuator 70 will hold intake valves 32 in the open position, independently of the action of cam assembly 52.

Controller 100 may open directional control valves 88 to allow intake valves 32 to close. This allows the pressurized fluid to flow out of actuator chamber 76. The force of springs 56 forces the fluid from actuator chamber 76, thereby allowing actuator piston 74 to move within actuator cylinder 72. This allows rocker arm 64 to pivot so that intake valves 32 are moved to the closed position.

In transitional mode operation, controller 100 may also enable valve actuation detection system 206 and valve actuation diagnostic system 208. As described previously, valve actuation detection system 206 may monitor the operation of valve actuators 70 to ensure proper operation. As also described previously, valve actuation diagnostic system 208 may start a count of "good" valve actuations and a count of valve actuation "faults."

In addition, controller 100 may govern the operation of other engine systems during transition mode operation. For example, controller 100 may control fuel injection system 202 to limit the quantity of fuel injected into cylinders 22. In particular, controller 100 may limit the quantity of fuel injected into cylinders 22 to a single fuel "shot" and/or to limit the amount of torque generated by engine 20. It is contemplated that other engine systems 20 may be similarly controlled during transition mode operation to prevent damage to engine 20 or any associated components.

Controller 100 may also verify that valve actuation system 204 is operational. (Step 322). Controller 100 may presume that valve actuation system 204 is operational if valve actuation detection system 206 indicates that the valve actuators 70 are operating properly and/or the count of "good" valve actuations has reached a certain threshold, such as, for example, 60. In addition, controller 100 may presume that valve actuation system 204 is operational if valve actuation system 204 has been operating for a predetermined period from the time at which the second temperature reaches a certain level. For example, controller 100 may presume that valve actuation system 204 is operational if valve actuation system 204 has been operating for approximately 30 minutes since the time at which the second temperature reaches approximately 75° C.

If controller 100 determines that valve actuation system 204 is not operational, controller 100 will continue to operate engine 20 in transition mode. Controller 100 will continue to monitor the operation of valve actuation system 204. When controller 100 determines that valve actuation system 204 is operating properly, controller 100 will engage normal operation of engine 20. (Step 328).

With reference to step 304, if controller 100 determines that both the first temperature and second temperature are greater than the respective predetermined limits, controller 100 may engage the warm start mode. (Step 324). When both temperatures are above the predetermined limits, controller 100 may presume that the temperature and viscosity of the operating fluid will allow proper operation of valve actuators 70. Accordingly, controller 100 may enable valve actuation system 204 to allow valve actuators 70 to implement a variation on the conventional valve actuation timing. Controller 100 may also remove any limitations on fuel injection system 202.

During warm start operation, controller 100 may monitor the operation of valve actuation system 204 to verify that valve actuators are operating properly. (Step 326). Controller 100 may presume that valve actuation system 204 is operational if valve actuation detection system 206 indicates that the valve actuators 70 are operating properly and/or the count of "good" valve actuations has reached a certain threshold, such as, for example, 60. In addition, controller 100 may presume that valve actuation system 204 is operational if valve actuation system 204 has been operating for a predetermined amount of time, such as, for example 30 minutes.

If controller 100 determines that valve actuation system 204 is not operational, controller 100 may change the operation of engine 20 to transition mode. (Step 316) As described above in connection with Step 316, controller 100 will limit the operation of fuel injection system 202 to prevent damage to engine 20 that may result from increased cylinder pressures. If controller 100 determines that valve actuation system 204 is operating properly, controller 100 will engage normal operation of engine 20. (Step 328).

During normal engine operation, controller 100 may operate valve actuation system 204 to implement a variation on the conventional valve actuation timing, such as, for example, a late-intake Miller cycle, depending upon the current operating conditions. Controller 100 may also enable the valve actuation detection system 206 and valve actuation diagnostic system 208 to identify any problems with valve actuators 70. Controller 100 may also remove any limitations on fuel injection system 202 to allow fuel injection system 202 to inject fuel according to load demands from an operator and/or the current operating conditions.

When engine 20 is in normal operation, controller 100 may continue to monitor the operation of valve actuators 70. If, during normal operation, controller 100 determines that one or more of valve actuators 70 are not operating properly, controller 100 may issue a warning, such as, for example, by illuminating an engine maintenance light.

As will be apparent from the foregoing description, the present disclosure provides a system and method for starting an engine having hydraulically actuated variable valve actuators. The described system and method may operate the engine in one of several operational modes depending upon the values of two sensed temperatures of the engine. Each of the operational modes provides for different levels of engine system control to protect the engine as the temperature of the hydraulic operating fluid increases. Once the engine temperatures rise above a certain limit and the hydraulic actuators function properly, the engine will shift to normal operation.

It will be apparent to those skilled in the art that various modifications and variations can be made in the system and method of the present disclosure without departing from the scope of the invention. Other embodiments may be apparent to those skilled in the art from consideration of the specification and practice of the system and method disclosed herein. It is intended that the specification and examples be considered as exemplary only, with a true scope being indicated by the following claims and their equivalents.

What is claimed is:

1. A method of controlling an engine, the engine including an engine valve, first and second valve actuators, and a cylinder, the method comprising:

enabling the first valve actuator to actuate the engine valve from a first position in which fluid is prevented from flowing past the engine valve to a second position in which fluid is permitted to flow past the engine valve and return the engine valve to the first position, the first valve actuator including a cam-follower arrangement;

sensing a first temperature indicative of an engine coolant temperature;

enabling the second valve actuator to prohibit the engine valve from returning to the first position when the first temperature is above a first predetermined value, the second valve actuator including a piston-cylinder arrangement; and disabling the second valve actuator when the first temperature is below the first predetermined value.

2. The method of claim 1, further including sensing a second temperature indicative of an intake manifold temperature; and enabling the second valve actuator to prohibit the engine valve from returning to the first position when the first temperature is above the first predetermined value and the second temperature is below a second predetermined value.

3. The method of claim 2, further including:

limiting an amount of fuel delivered to the cylinder when the first temperature is below the first predetermined value; and not limiting an amount of fuel delivered to the cylinder when the first temperature is above the first predetermined value and the second temperature is above the second predetermined value.

4. The method of claim 2, further including limiting an amount of fuel delivered to the cylinder when the first temperature is above the first predetermined value and the second temperature is below the second predetermined value.

5. The method of claim 1, wherein enabling the second valve actuator includes closing a control valve to increase the pressure of fluid directed toward the piston-cylinder arrangement.

6. The method of claim 1, wherein the engine further includes a detection system, the method further including limiting an amount of fuel delivered to the cylinder when the detection system detects improper operation of the second valve actuator and not limiting an amount of fuel delivered to the cylinder when the detection system detects proper operation of the second valve actuator and the second temperature is above the second predetermined value.

7. The method of claim 1, wherein disabling the second valve actuator includes opening a control valve to decrease the pressure of fluid directed toward the piston-cylinder arrangement.

8. A method of controlling an engine, the engine including an engine valve, a detection system, a valve actuator, and a cylinder, the method comprising:

activating the engine valve from a first position in which fluid is prevented from flowing past the engine valve to a second position in which fluid is permitted to flow past the engine valve and returning the engine valve to the first position with a first valve timing;

sensing a first parameter indicative of a first temperature;

sensing a second parameter indicative of a second temperature;

enabling the detection system to monitor an operation of the valve actuator when at least one of the first and second parameters is above a first predetermined value;

enabling the valve actuator to modify the first valve timing when at least one of the first and second parameters is above the first predetermined value and the detection system detects proper operation of the valve actuator;

limiting an amount of fuel delivered to the cylinder when the detection system detects improper operation of the valve actuator; and disabling the detection system when the first and second parameters are each below the first predetermined value.

9. The method of claim 8, wherein enabling the valve actuator to modify the first valve timing includes enabling the valve actuator to modify the first valve timing when the first and second parameters are each above the first predetermined value and the detection system detects proper operation of the valve actuator.

10. The method of claim 8, further including limiting an amount of fuel delivered to the cylinder when the first and second parameters are each above the first parameter and the detection system detects an improper operation of the valve actuator.

11. The method of 8, further including limiting an amount of torque generated by the engine when the detection system determines an improper operation of the valve actuator.

12. The method of claim 8, further including not limiting an amount of fuel delivered to the cylinder when the detection system detects proper operation of the valve actuator and at least one of the first and second parameters is above the first predetermined value.

13. The method of claim 8, wherein the first parameter is indicative of an engine coolant temperature and the second parameter is indicative of an intake manifold temperature.

14. An engine valve actuation system comprising:

a first valve actuator configured to move an engine valve between a first position substantially blocking a flow of fluid past the engine valve and a second position allowing a flow of fluid past the engine valve;

a second valve actuator configured to hold the engine valve in a third position allowing a flow of fluid past the engine valve;

a first sensor configured to establish a signal indicative of a first temperature;

a second sensor configured to establish a signal indicative of a second temperature;

a fuel injection system configured to deliver fuel to a combustion chamber;

a controller configured to enable operation of the second valve actuator by closing a control valve and selectively enable operation of the second valve actuator when the first temperature is above a first predetermined value and the second temperature is below a second predetermined value.

15. The system of claim 14, wherein the controller is further configured to selectively enable operation of the second valve actuator when the first and second temperatures are above first and second predetermined values, respectively.

16. The system of claim 14, wherein the controller is further configured to disable operation of the second valve actuator by opening the control valve and selectively disable operation of the second valve actuator when the first and second temperatures are below the first and second predetermined values, respectively.

17. The system of claim 14, wherein the controller is further configured to disable operation of the second valve actuator subsequent to the controller enabling operation of the second valve actuator and after a predetermined period of time.

18. The system of claim 14, wherein:
the first valve actuator includes a cam-follower arrangement configured to move the engine valve between the first and second positions as a function of the rotation of the cam; and the second valve actuator includes a piston-cylinder arrangement configured to hold the engine valve in the third position as a function of the pressure of fluid directed toward the cylinder.

19. The system of claim 14, wherein the first temperature is indicative of an engine coolant temperature and the second temperature is indicative of an intake manifold temperature.

\* \* \* \* \*

UNITED STATES PATENT AND TRADEMARK OFFICE
CERTIFICATE OF CORRECTION

PATENT NO. : 7,228,828 B2
APPLICATION NO. : 11/273023
DATED : June 12, 2007
INVENTOR(S) : Kagy et al.

It is certified that error appears in the above-identified patent and that said Letters Patent is hereby corrected as shown below:

Title Page;
On Page 2, in Field (56), under "FOREIGN PATENT DOCUMENTS", in Column 2, Line 1, delete "JP   WO 98/02653   1/1998" and insert
-- WO   WO 98/02653   1/1998 --, therefor.

In Column 4, Line 3, delete "0.36" and insert -- 36 --, therefor.

In Column 7, Line 42, delete "0.24" and insert -- 24 --, therefor.

Signed and Sealed this

First Day of July, 2008

JON W. DUDAS
*Director of the United States Patent and Trademark Office*